US007017174B1

(12) United States Patent
Sheedy

(10) Patent No.: US 7,017,174 B1
(45) Date of Patent: Mar. 21, 2006

(54) METHODS AND APPARATUS FOR PROVIDING A CENTRAL RECORDER IN A BROADCAST SYSTEM

(75) Inventor: Aaron J. Sheedy, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 761 days.

(21) Appl. No.: 09/919,330

(22) Filed: Jul. 30, 2001

(51) Int. Cl.
H04N 7/173 (2006.01)

(52) U.S. Cl. .................... 725/87; 725/91; 725/120; 386/46

(58) Field of Classification Search ............ 725/86, 725/87, 83, 91, 92, 98, 109, 114, 115, 120, 725/116, 142, 144, 151; 386/46, 35, 83, 386/89, 124
See application file for complete search history.

(56) References Cited

U.S. PATENT DOCUMENTS

| 5,371,532 | A | * | 12/1994 | Gelman et al. ............... 725/88 |
| 5,818,512 | A | * | 10/1998 | Fuller ........................... 725/82 |
| 6,226,447 | B1 | | 5/2001 | Sasaki et al. |
| 6,233,389 | B1 | | 5/2001 | Barton et al. |
| 2001/0003846 | A1 | * | 6/2001 | Rowe et al. .................. 725/47 |
| 2002/0019984 | A1 | * | 2/2002 | Rakib .......................... 725/111 |
| 2003/0149988 | A1 | * | 8/2003 | Ellis et al. .................... 725/87 |

OTHER PUBLICATIONS

Heller, Arthur; VPS a new System for domestic VCR start/stop by programme labels transmitted withing the insertion data line Jun. 1985; Institut für Rundfunktechnik; pp. 345-352.*
"nCUBE Chosen to Showcase Network Network PVR at CTAM Summit," nCUBE.com, Jun. 26, 2001, <http://www.ncube.com/pressroom/pressreleases/pr2001_06_26_nPVR_at_CTAM.html> [retrieved Jul. 19, 2001].
"The nCUBE nPVR Solution—Making TV Personal," nCUBE.com, n.d., [no date].

* cited by examiner

Primary Examiner—David L. Ometz
Assistant Examiner—James A. Fletcher
(74) Attorney, Agent, or Firm—Christensen O'Connor Johnson Kindness PLLC

(57) ABSTRACT

Systems and methods for providing a central recorder in an interactive broadcast television network environment are disclosed. A broadcast center records and stores incoming content as it is received from local, regional and/or national broadcasters to facilitate time shifting of content for clients, and to provide an efficient mechanism for the distribution and/or redistribution of content. Content may be distributed or redistributed to one or more of client terminals, to the originating broadcaster, to a parent network, to an interactive television service, or to other third parties with an interest in receiving the content.

38 Claims, 4 Drawing Sheets

METHODS AND APPARATUS FOR PROVIDING A CENTRAL RECORDER IN A BROADCAST SYSTEM

TECHNICAL FIELD

This disclosure relates generally to electronic entertainment broadcast systems, and more particularly, but not exclusively, to apparatus and methods for providing a central recording system to facilitate time shifting and/or redistribution of television broadcast content in a television network environment.

BACKGROUND

In recent years, the television has arguably become the predominant entertainment medium. With this popularity, viewers increasingly demand components or services that enable them to facilitate the time shifting of programming to fit their busy schedules, when tuning in to watch an original broadcast is inconvenient. For many years, viewers have been able to record their favorite television broadcasts via video-cassette recorders ("VCRs"), and play back the recorded content at a more convenient time. More recently, many viewers have begun to utilize digital recording systems, often integrated into a set-top box or other system, which provides access to broadcast content from a cable television provider, or the like.

While VCRs and integrated digital recording systems are effective when used properly, and have been incorporated into the entertainment systems of millions of households across the country and throughout the world, many viewers find that programming their VCRs or other recording devices to record their favorite content is both problematic and frustrating, and often times, for one reason or another, results in the desired content not being recorded as the viewer intended. Many solutions to this ongoing problem have been proposed, including such things as VCRPlus® codes, and the like, but the problem has persisted. Moreover, the addition of a VCR or integrated digital recording system to one's entertainment system represents a significant cost incurred by each viewer.

Interactive television provides viewers with an alternative source for information, such as news, weather, sports coverage, or the like, which the viewer may have missed because of his or her unavailability to view an original broadcast having the information, or because of a problem encountered while attempting to program a recording device as discussed above. Interactive television generally comprises a video technology in which a viewer interacts with standard television programming. A typical use of interactive television includes Internet access.

While interactive television may provide access to some form of the information missed by the viewer, such as headlines, summaries, or written descriptions of news reports, much of the originally broadcast content is unavailable because broadcasters often find it inefficient to rebroadcast or redistribute programming content because of the costs associated with converting the content into a format that is easily distributed, or easily made available via alternate access methods, such as for example, interactive television.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of systems and methods for providing a central recording system to facilitate time shifting and/or redistribution of television broadcast content in a television network environment are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide systems and methods wherein a broadcast center records and stores incoming content as it is received from local, regional, national broadcasters, and/or other content sources to facilitate time shifting of content for clients, and to provide an efficient mechanism for the distribution and/or redistribution of content to the originating broadcaster, to a parent network, to an interactive television service, or to other third parties with an interest in receiving the content. Other features of the illustrated embodiments will be apparent to the reader from the foregoing and the appended claims, and as the detailed description and discussion is read in conjunction with the accompanying drawings.

Figure 1:
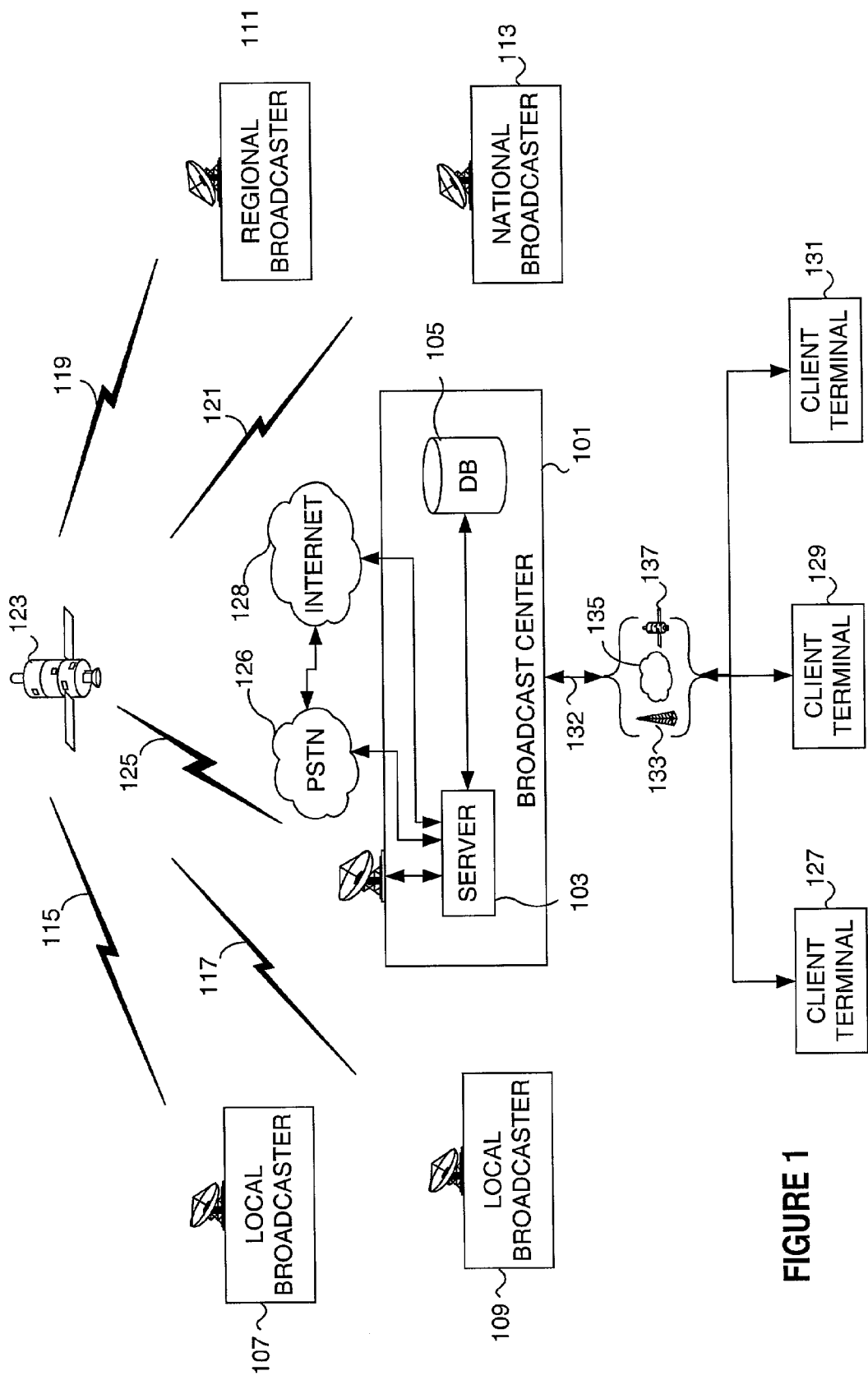
FIG. 1 is a pictorial block diagram illustrating an interactive broadcast television network environment in accordance with an embodiment of the invention.

Referring now to the drawings, and in particular to FIG. 1, there is illustrated one embodiment of an interactive broadcast television network environment in accordance with the teachings of the present invention. As illustrated in the depicted embodiment, a broadcast center 101, comprising a server 103 and a database 105 (also referred to herein as a "storage device"), is configured to receive communications from a plurality of broadcasters, including local broadcasters 107 and 109, a regional broadcaster 111, a national broadcaster 113, and/or other content sources. In the embodiment illustrated in FIG. 1, the communications to the broadcast center 101 are facilitated via satellite links 115, 117, 119, and 121 transmitted between each of the broadcasters 107, 109, 111, and 113, respectively, and a satellite 123 positioned in a geosynchronous orbit, and a link 125 between the satellite 123 and the broadcast center 101. The broadcast center 101 may comprise a cable network headend, a satellite broadcast operations center, or other facility configured to receive and transmit broadcast signals. In an embodiment, the broadcast center 101 may be connected to a public switched telephone network ("PSTN") 126, an Internet 128, or other network. In one embodiment, each of the broadcasters 107, 109, 111, and 113 may also be connected to the PSTN, the Internet, or to another network to enable communications to and from one another, and to and from the broadcast center 101.

In the illustrated embodiment, the broadcast center 101 is also configured to broadcast information, which may comprise programming content, to a plurality of client terminals 127, 129, and 131. In the embodiment shown in FIG. 1, the client terminals 127, 129, and 131 may receive a broadcast from the broadcast center 101 via a link 132 provided through a broadcast antenna 133, a network 135, or via a satellite 137. The link 132 may be a bi-directional wireless radio frequency ("RF") link from the broadcast antenna 133 in a format such as for example, but not limited to, known amplitude modulation ("AM") or frequency modulation ("FM") radio signals, television ("TV") signals, digital video broadcast ("DVB") signals, or the like, which are broadcast through the atmosphere. In other embodiments, the link 132 may comprise a direct broadcast satellite ("DBS") system link between the broadcast center 101 and each of the client terminals 127, 129, and 131.

In yet other embodiments, the link 132 may comprise a bi-directional link through the network 135 to each of the client terminals 127, 129, and 131, thereby enabling each of the client terminals to communicate information to the broadcast center 101. In one embodiment, the network 135 may be any type of communications network through which a plurality of different devices may communicate, such as for example, but not limited to, the Internet, a wide area network ("WAN"), a local area network ("LAN"), an intranet, or the like. In still other embodiments, the link 132 may comprise a combination of the links described above to facilitate communication between the broadcast center 101 and each of the client terminals 127, 129, and 131. For example, communications from the broadcast center 101 may be via a uni-directional link transmitted via the broadcast antenna 133 or the satellite 137, while communications from each of the client terminals 127, 129, and 131 to the broadcast center 101 may be via a separate "back channel" link through the network 135. In making reference to first, second, and/or third communications links, it is intended to be understood that the links may comprise a common transmission platform, or the links may comprise separate transmission platforms. For example, in one embodiment, the first communications link may comprise a satellite transmission, while the second and third communications links may comprise a bi-directional cable transmission. In another embodiment, the first, second, and third communications links may all comprise a satellite transmission.

In an embodiment, the broadcast center 101 is configured to broadcast a plurality of programming content, which may be received by the client terminals 127, 129, and 131. The programming content may comprise any combination of a number of different types of television programming, interactive content, or the like. The programming content may be transmitted as data streams encoded using a Moving Pictures Experts Group ("MPEG") standard, a set of standards for audio and video compression established by the Joint ISO/IEC Technical Committee on Information Technology; as data over cable service interface specification ("DOCSIS") protocol, or via other suitable data communication protocols; or via microwave, RF, or other electromagnetic waves transmitted through the atmosphere, in various embodiments.

Where the broadcast comprises a satellite TV delivery system, such as the DBS system, signals may be received by an antenna, for example, a small satellite dish, and communicated to a digital integrated receiver/decoder ("IRD"), which separates each channel, and decompresses and translates the digital signal for display on a television set or the like. Programming for a DBS system may be distributed, for example, by multiple high-power satellites (e.g., the illustrated satellite 123) positioned in a geosynchronous orbit, each having multiple transponders. Compression may be used to increase the amount of programming content that can be transmitted in the available bandwidth.

In the DBS system, the satellite broadcast operations center may be used to gather programming content, as discussed above, ensure its digital quality, and transmit the signal to the satellites. Programming may come to the satellite broadcast operations center from the broadcasters 107, 109, 111, 113, and/or other content providers, via satellite, fiber optic cable, special digital tape, and/or other transmission mechanisms. Satellite-delivered programming is typically immediately digitized, encrypted, and uplinked to the orbiting satellites. The satellites retransmit the signal back down to every compatible client terminal at customer's homes and/or businesses. Where programming is recorded in the satellite broadcast operations center for later broadcast, technicians may utilize post-production equipment to view and analyze each piece of programming content to ensure audio and video quality. In an embodiment, robotic tape handling systems may be utilized to facilitate playback, and playback may be triggered by a computerized signal sent from a broadcast automation system. In one embodiment, back-up videotape playback equipment may be used to ensure uninterrupted transmission at all times.

Figure 2:
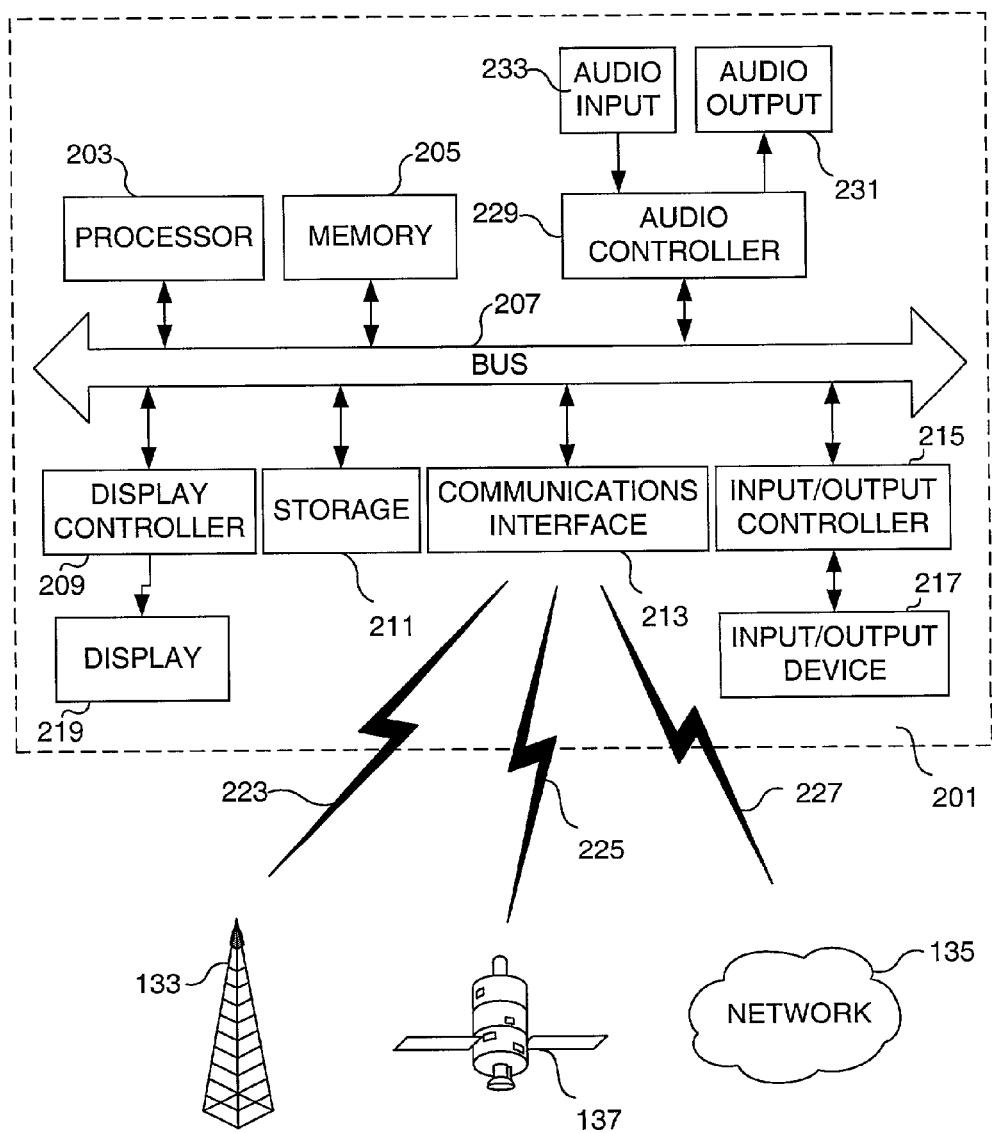
FIG. 2 is a block diagram of an embodiment of a computer system representative of a client terminal or a server in accordance with an embodiment of the invention.

Referring now primarily to FIG. 2, which shows a block diagram illustrating one embodiment of an apparatus (also "machine" for executing "machine-readable" instructions) 201 that may be used for the server 103, or the client terminals 127, 129, or 131 in accordance with the teachings of the present invention. Typically, client terminals 127, 129, and 131 may employ various types of apparatus depending on the particular nature of the broadcast being transmitted from the broadcast center 101. These various apparatus may include a set-top box to receive communications transmitted via the network 135, the IRD for receiving DBS signals from the satellite 137, or an electromagnetic wave (e.g., RF) transceiver/processor for receiving signals transmitted from the broadcast antenna 133. The apparatus used for the server 103 will typically comprise a computer server or similar type of server hardware that is designed to broadcast data to a plurality of client terminals. In one embodiment, the apparatus 201 is a computer, a set-top box, an IRD, or a receiver/processor that includes a processor 203 coupled to a bus 207. In one embodiment, a memory 205, a storage 211, a display controller 209, a communications interface 213, an input/output controller 215, and an audio controller 229 are also coupled to the bus 207.

In one embodiment, the apparatus 201 interfaces to external systems through the communications interface 213. The communications interface 213 may include a radio transceiver compatible with AM, FM, TV, digital TV, DVB, wireless telephone signals, or the like. The communications interface 213 may also include an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 223 is received/transmitted by the communications interface 213 to communicate with the broadcast antenna 133. In one embodiment, a carrier wave signal 225 is received/transmitted by the communications interface 213 to communicate with the satellite 137. In one embodiment, a carrier wave signal 227 is received/transmitted between the communications interface 213 and the network 135. In one embodiment, the communications signal 227 may be used to interface the apparatus 201 with another computer system, a network hub, a router, or the like. In one embodiment, the carrier wave signals 223, 225, and 227 are considered to be machine-readable media, which may be transmitted through wires, cables, optical fibers, or through the atmosphere, or the like.

In one embodiment, the processor 203 may be a conventional processor, such as for example, but not limited to, an Intel x86 processor, or Pentium family microprocessor, a Motorola family microprocessor, or the like. The memory 205 may be a machine-readable medium such as dynamic random access memory ("DRAM"), and may include static random access memory ("SRAM"). The display controller 209 controls, in a conventional manner, a display 219, which, in one embodiment may be a cathode ray tube ("CRT"), a liquid crystal display ("LCD"), an active matrix display, a television monitor, or the like. An input/output device 217, coupled to the input/output controller 215 may be a keyboard, a disk drive, a printer, a scanner, or other input/output device, including a television remote, a mouse, a trackball, a trackpad, a joystick, or the like. In one embodiment, the audio controller 229 controls in a conventional manner an audio output 231, which may include for example, audio speakers, headphones, an audio receiver, an amplifier, or the like. In one embodiment, the audio controller 229 also controls, in a conventional manner, an audio input 233, which may include for example, a microphone, or input(s) from an audio or musical device, or the like.

Storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Having observed the general relationship among the various components of the interactive broadcast television network environment illustrated in FIG. 1, attention may now be given to the details of embodiments of the present invention, which provide systems and methods wherein the broadcast center 101 records and stores the incoming programming content as it is received from the plurality of broadcasters to facilitate time-shifting of content for transmission to the client terminals, and/or to provide an efficient mechanism for the distribution or redistribution of content to the originating broadcaster, to a parent network, to an interactive television service, or to other third parties with an interest in receiving the content.

Figure 3:
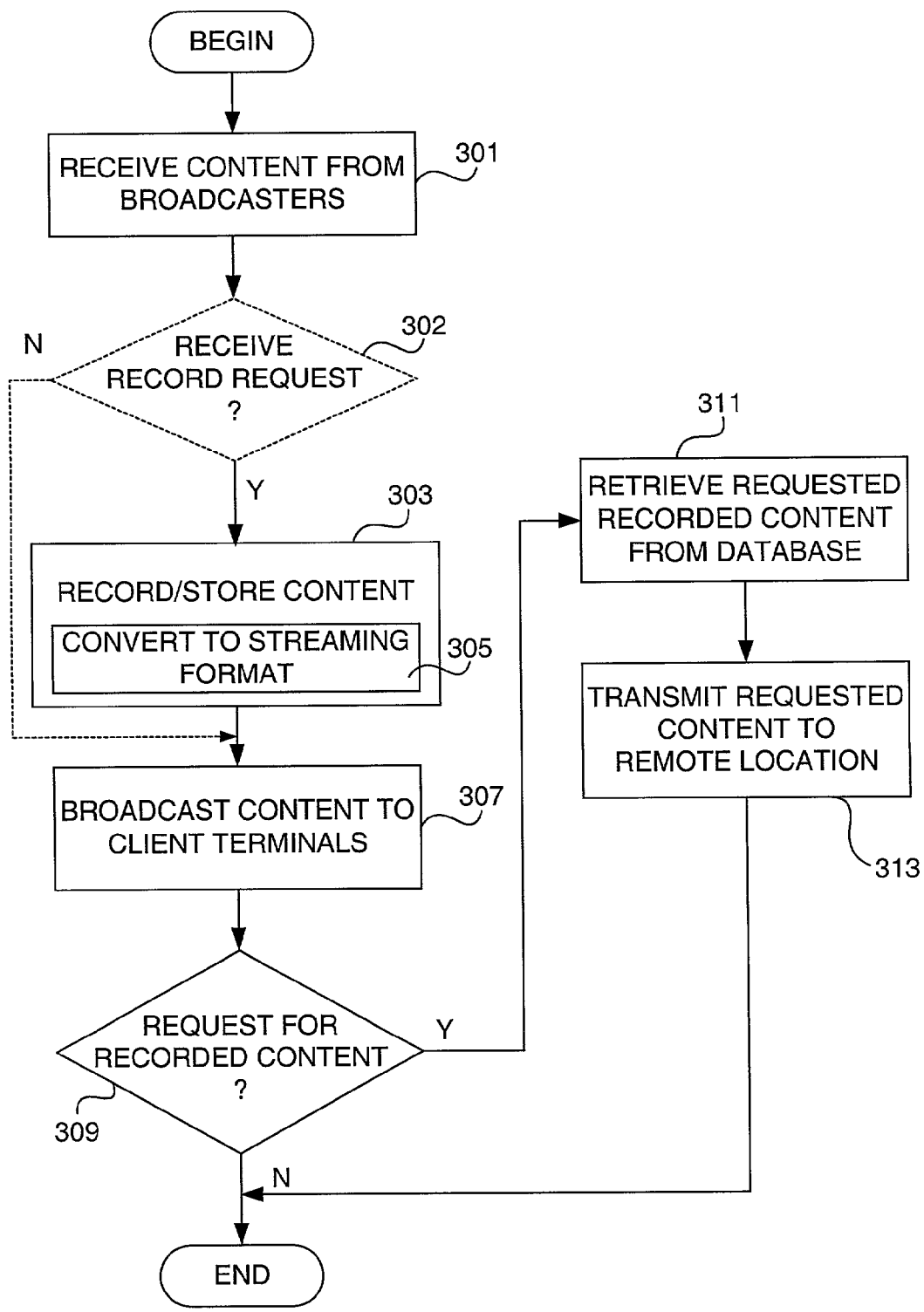
FIG. 3 is a flow diagram illustrating the flow of events in an embodiment of the invention wherein programming content may be recorded to facilitate time shifting of the content for viewers, or to redistribute content to service providers.

With reference now primarily to FIG. 3, a flow diagram illustrating the flow of events in an embodiment of the invention wherein programming content may be recorded to facilitate time shifting of the content for viewers, or to distribute content to service providers, is shown ("viewers" or "clients" and "service providers" are herein collectively referred to as "users"). Components of the flow diagram of FIG. 3 may be embodied in software or other machine-readable instructions stored on a machine-readable medium, such as the memory 205 or storage 211 of FIG. 2. An interactive broadcast television network, such as for example, one similar to that illustrated in the embodiment shown in FIG. 1, receives a plurality of programming content from local broadcasters 107 and 109, which may be local affiliates of network television stations such as ABC®, NBC®, CBS®, FOX®, or the like, as illustrated by process block 301. In addition to the local broadcasters 107 and 109, the broadcast center 101 may also receive programming content from one or more regional broadcasters 111, and one or more national broadcasters 113. The regional broadcaster 111 may comprise a television station producing content for broadcast throughout a limited geographical area, such as for example, a news organization that serves a region of the country such as the northwest, and broadcasts only to the states of Washington, Oregon, and Idaho, for example. The national broadcaster 113 may comprise a parent organization of one of the local affiliates, such as ABC®, NBC®, CBS®, or FOX®, or a nationally broadcast specialty programming station such as HBO®, CNN®, MSNBC®, Nickelodeon®, The Discovery Channel®, or the like. It will be appreciated that the number and kind of broadcasters producing and transmitting programming content to the broadcast center 101 may vary from one locale to another, and that the illustrated embodiment is an example only.

Upon receiving the programming content from the plurality of broadcasters (see, e.g., block 301), in an embodiment, the broadcast center 101 may determine whether a record-request has been received from any one or more of the plurality of client terminals 127, 129, or 131, for example, or from a service provider, as indicated by process block 302. If no such record-request has been received, in an embodiment, process blocks 303 and 305 are skipped, and the content is broadcast to the plurality of client terminals 127, 129, and 131, as indicated by process block 307. If a record-request has been received from at least one of the plurality of client terminals 127, 129, or 131, or a service provider, then the broadcast center 101 records and stores the requested content in the database 105 at a recording location, as indicated by process block 303, and then proceeds to broadcast the programming content to the plurality of client terminals 127, 129, and 131, as indicated above at the process block 307.

In other embodiments, the broadcast center 101 records and stores the content (see, e.g., process block 303) in the database 105 connected to the server 103 via a storage interface (not shown) designed to retrieve and/or store information in the database 105 without considering whether a specific request to record content has been received from one or more of the plurality of client terminals 127, 129, and 131, or a service provider. As such, the process block 302 indicating the consideration of whether or not a record-request has been received may be utilized in some embodiments of the present invention, and may be disregarded in other embodiments of the present invention, as indicated by the dashed lines of block 302.

The database 105 may comprise a digital storage device, such as a hard disk drive, or other memory device. The recordation and storage of the programming content may be facilitated by the placement of triggers in the content by the broadcasters 107, 109, 111, and 113 prior to transmission of the content to the broadcast center 101. The incorporation of triggers into both analog and digital transmissions is well known in the art, and will not be discussed in great detail herein. The triggers may include descriptive information regarding the content of the broadcast, the date of broadcast, and/or the duration of the content. Triggers may also be utilized by the broadcast center 101 to identify the demarcation of the beginning and end of a particular piece of programming content so that the recording process can be started and stopped accordingly. The programming content may be stored in the database 105 and indexed according to the information contained in the triggers, in an embodiment.

By indexing the database 105 according to the descriptive information included in the triggers, or by other identifying information, the identification and retrieval of requested content is facilitated. For example, a relational database management system may be utilized to store and retrieve recorded programming content. Tables included in the database structure may include information such as identification numbers corresponding to each client terminal (i.e., addressable terminals), recording dates/times, broadcast dates/times, channel numbers, and/or descriptive information regarding each piece of programming content, such as names of actors, title, subject, genre, and the like. This information may then be utilized to facilitate the retrieval and transmittal of desired content requested by one or more users through a subscription service, or otherwise.

Information in the triggers can be identified, extracted, and decoded by hardware and software of the server 103, or by other components at the broadcast center 101. Thus, by "reading" the triggers of incoming broadcast content, relevant content can be identified and recorded. In another embodiment, relevant content may be identified by reading the close-captioning information that accompanies the incoming broadcast content. Such close-captioning information may be present in the vertical blanking interval ("VBI"), for instance. In yet another embodiment, electronic program guide ("EPG") information provided by the broadcasters 107, 109, 111, and 113 may also be consulted by hardware and/or software of the broadcast center 101 to identify relevant content to record.

In an embodiment, the record-request may comprise a request from a user to the broadcast center 101 to record a particular television program to be broadcast at a specific date and/or time. In another embodiment, the record-request may comprise a request to record all programming content according to various user-specified preferences which may be identified in the triggers. The user-specified preferences may include descriptions of the content, for example, a title or a name of an individual featured in the content, or the like, whether the content is a movie, a news clip, or other programming content.

In addition to, or as part of, storing the programming content, the broadcast center 101 may convert the programming content into a streaming format (see, e.g., process block 305) such that it may be accessible via RealPlayer®, Windows Media Player®, or other third party applications. Methods for converting data into a streaming format are well known to those skilled in the art and will not be discussed in greater detail herein. An advantage of converting the programming content into a streaming format is that the data is more highly compressed and may be stored more readily, and transmitted more efficiently via a network such as the Internet, or the like.

The programming content is then broadcast to the client terminals (see, e.g., process block 307) via one or more of the methods described above, and received by the communications interface 213 of each client terminal wherein it may be processed for display on a television set or the like. The broadcast to the client terminals includes, in an embodiment, all of the incoming programming content, including real-time versions of programming content that has been recorded, stored, or converted into another format by the broadcast center 101.

If a viewer is unable to view the current broadcast of a particular piece or pieces of programming content due to some inconvenience, he or she may send a request to the broadcast center to transmit the desired content at a particular time. In one embodiment, the broadcast center will only record the programming content explicitly requested by at least one user via a record-request, as discussed previously. In other embodiments, all or a portion of the incoming programming content may be recorded by the broadcast center 101 to enable the user to submit his or her request to receive recorded content after the original broadcast of the programming content to the plurality of client terminals 127, 129, and 131 has already taken place. As used herein, user is intended to refer to either end-users of the client terminals 127, 129, and 131, or the originating broadcaster or other broadcaster, such as the local broadcasters 107, 109, the regional broadcaster 111, or the national broadcaster 113, or other third parties interested in receiving content from the broadcast center 101.

In an embodiment, if a request for recorded content (designating one or more user-specified preferences) is received by the broadcast center 101 from one or more of the plurality of client terminals 127, 129, or 131 (see, e.g., process block 309), or a service provider, then the server 103 retrieves the requested content from the database 105 (see, e.g., process block 311), or other storage location, in response to the user-specified preferences, and transmits the requested content to a location remote from the recording location (hereinafter "remote location"), designated by the requesting user (see, e.g., process block 313). The remote location may comprise one or more of the plurality of client terminals, an originating broadcaster, a parent network, an interactive television service provider, or other third party with an interest in receiving the programming content. In one embodiment, the remote location may comprise an interactive television service operated, in a common facility, by the broadcast center making the recording of the incoming broadcast content.

If the requested piece of programming content is to be transmitted to one or more of the plurality of client terminals 127, 129, and 131, then the viewer, at each respective client terminal, may access a designated channel on his or her set-top box, IRD, or other receiver device, and receive the content that has been addressed to his or her specific addressable client terminal, or view one of a plurality of channels designated for delivery of recorded content that are otherwise encrypted in a manner similar to pay-per-view broadcasts, or the like. As mentioned, each client terminal may be designated with a specific address on a network or otherwise to enable information to be broadcast to all client terminals and only received by those client terminals to which the information is addressed. Methods of providing addressable client terminals are well known in the art, and need not be discussed in greater detail. In other embodiments, the content may be delivered via DOCSIS on a designated channel in response to a browser request from the client terminal. In still other embodiments, the requested content may be downloaded to a digital recording device such as a personal video recorder or digital video recorder coupled to or integrated with the client terminal so that a viewer may access the content and play it back at his or her discretion.

By providing a central recording system such as that described above, the viewer no longer must rely on a recording device purchased and maintained by the viewer at their home or other location to time shift programming content when the original broadcast time is inconvenient. Moreover, by allowing the viewer to request recorded content after the original broadcast has already begun, or has been completed, the viewer may access programming content that he or she would otherwise have missed because of an event that caused him or her to be away unexpectedly, thereby preventing the viewer from programming his or her VCR or integrated digital recording device to record the desired content.

Figure 4:
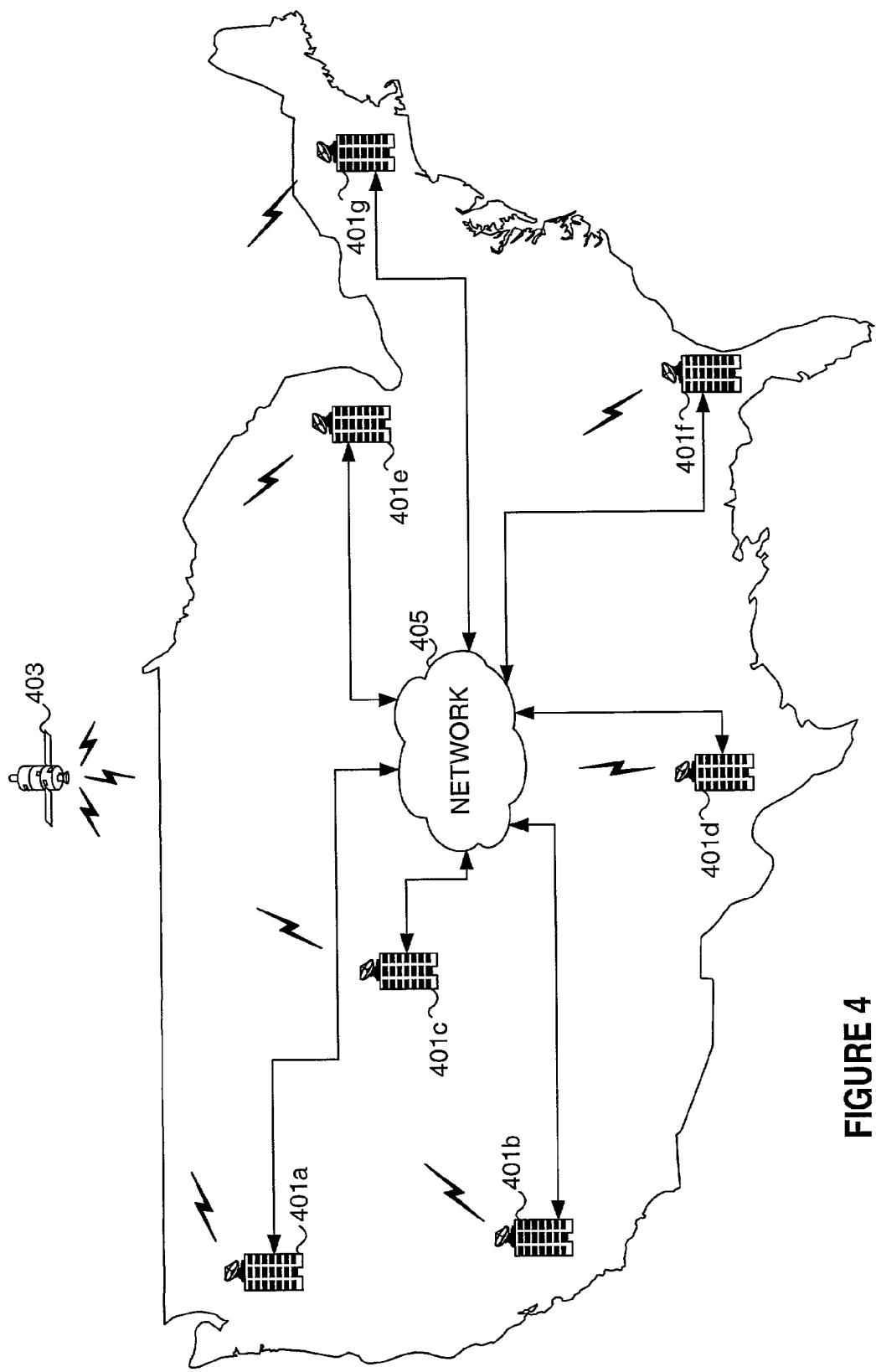
FIG. 4 is a pictorial block diagram illustrating a nationwide network of service providers in accordance with an embodiment of the invention.

With reference now primarily to FIG. 4, there is illustrated a pictorial block diagram depicting a nationwide network of service providers in accordance with an embodiment of the invention. Each service provider 401x (where x includes "a–g") may be interconnected to one or more of the other service providers 401x by communication links via a satellite 403, or via a network 405, such as the Internet, a WAN, a LAN, the PSTN, or the like. The service providers 401x illustrated in FIG. 4 may be broadcast centers as described above, local, regional, or national broadcasters, including parent networks of local affiliates, interactive television service providers, or other third parties having an interest in disseminating content or making content available to consumers.

As discussed previously, service providers may request recorded content (see, e.g., block 309) from the broadcast center 101 in a manner analogous to a request made from a client terminal. The ability to record, retrieve, and distribute programming content via the satellite 403 or the network 405, facilitates the dissemination of information from one locale to another, or throughout the country or the world. In one embodiment, programming content, produced by a local broadcaster, may be recorded by a broadcast center 401a located in the northwest region of the United States, for example. An interactive television service provider 401b, located in southern California, for example, may request a portion of the recorded programming content from the broadcast center 401a in order to provide subscribers of the service access to streaming video and/or audio of important news events happening in the northwest, or in other locations distant from them. In other embodiments, a local network affiliate located in the southeast region of the United States, for example, may produce programming content that is believed to be of interest throughout the country. That programming content may be recorded by a broadcast center 401f in the same locale. A parent network 401g, located, for example, in New York City, may request the programming content from the broadcast center 401f in order to make the content available to local affiliates in other regions of the country, or to an interactive service associated with the parent network, which may be a multiple system operator.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes, which come within the meaning and range of equivalency of the claims are intended to be embraced therein.

What is claimed is:

1. A method, comprising:
   receiving programming content from a plurality of broadcasters at a broadcast center;
   recording at least a portion of the programming content in a storage device without previously receiving a request from a client terminal to record the content;
   in response to a user-specified preference, retrieving at least one piece of programming content from the storage device, wherein the at least one piece of programming content has previously been broadcast to a plurality of client terminals at a broadcast time without request from the client terminals; and
   transmitting the at least one piece of programming content to a location remote from a recording location at a time different from the broadcast time.

2. The method of claim 1, further comprising: detecting information that accompanies the programming content to determine whether to record the portion of the programming content.

3. The method of claim 2, wherein the information comprises triggers.

4. The method of claim 1, wherein the location remote from the recording location comprises an originating broadcaster.

5. The method of claim 1, wherein the location remote from the recording location comprises a parent network.

6. The method of claim 1, wherein the location remote from the recording location comprises an interactive television service.

7. The method of claim 6, wherein the interactive television service is maintained in a common facility with the recording location.

8. The method of claim 1, wherein the remote location comprises a content provider communicatively coupled to the broadcast center.

9. The method of claim 1, wherein recording at least a portion of the programming content includes converting the programming content into a streaming data format.

10. The method of claim 1, wherein recording at least a portion of the programming content comprises responding to a record-request from a service provider.

11. The method of claim 10, wherein the service provider comprises a second broadcast center.

12. The method of claim 10, wherein the service provider comprises an originating broadcaster.

13. The method of claim 10, wherein the service provider comprises a parent network.

14. The method of claim 10, wherein the service provider comprises an interactive television service.

15. The method of claim 10, wherein the service provider comprises a content provider communicatively connected to the broadcast center.

16. The method of claim 1, wherein retrieving at least one piece of programming content includes correlating the user-specified preference with stored information, the stored information corresponding to the piece of programming content to be retrieved.

17. A method, comprising:
receiving programming content from a plurality of broadcasters at a broadcast center;
recording at least one piece of the programming content in a storage device without previously receiving a request from a client terminal to record the content;
retrieving the at least one piece of the programming content from the storage device, wherein the at least one piece of programming content has previously been broadcast to a plurality of client terminals at a broadcast time without request from the client terminals; and
transmitting the at least one piece of the programming content to at least one user at a time different from the broadcast time.

18. The method of claim 17, wherein the at least one user comprises a service provider communicatively coupled to the broadcast center.

19. A method, comprising:
receiving programming content from a plurality of broadcasters;
converting the programming content into a streaming data format;
recording at least a portion of the programming content in a storage device without previously receiving a request to record the content;
retrieving at least one piece of programming content from the storage device; and
transmitting the at least one piece of programming content to an interactive television service to allow access to the at least one piece of programming content via a network after the at least one piece of programming content has been broadcast to a plurality of client terminals.

20. A broadcast center, comprising:
a server, the server including:
 a processor;
 a storage interface coupled to the processor;
 a communications interface coupled to the processor, the communications interface being configured to receive programming content from a plurality of broadcasters; and
 a memory, coupled to the processor, to store a plurality of machine instructions; and
a storage device, coupled to the server, to store the programming content; and
wherein execution of the machine instructions by the processor causes the server to:
 receive the programming content from the plurality of broadcasters via a first communications link;
 record at least a portion of the programming content in the storage device at a recording location without previously receiving a request from a client terminal to record the content;
 broadcast the programming content to a plurality of client terminals via a second communications link;
 retrieve at least one piece of programming content from the storage device in response to a user request for recorded content; and
 transmit the at least one piece of programming content to a location remote from the recording location after the broadcast of the programming content has taken place.

21. The broadcast center of claim 20, wherein execution of the machine instructions by the processor further causes the server to detect information that accompanies the programming content to determine whether to record the portion of the programming content.

22. The broadcast center of claim 21, wherein the information comprises triggers.

23. The broadcast center of claim 20, wherein the remote location comprises at least one of the plurality of broadcasters from which the programming content was received.

24. The broadcast center of claim 20, wherein the remote location comprises a parent network of at least one of the plurality of broadcasters from which the programming content was received.

25. The broadcast center of claim 20, wherein the remote location comprises an interactive television service.

26. The broadcast center of claim 20, wherein recording at least a portion of the programming content includes converting the programming content into a streaming data format.

27. The broadcast center of claim 20, wherein recording at least a portion of the programming content comprises, responding to a record-request received from a service provider via a third communications link.

28. The broadcast center of claim 20, wherein retrieving at least one piece of programming content includes correlating a user-specified preference with stored information, the stored information corresponding to a piece of programming content to be retrieved.

29. An article of manufacture, comprising:
a machine-readable medium including instructions stored thereon, to:
receive programming content from a plurality of broadcasters at a broadcast center;
record at least a portion of the programming content in a storage device at a recording location without previously receiving a request from a client terminal to record the content;
in response to a user-specified preference, retrieve at least one piece of programming content from the storage device, wherein the at least one piece of programming content has previously been broadcast to a plurality of client terminals at a broadcast time without request from the client terminals; and
transmit the at least one piece of programming content to a location remote from the recording location at a time different from the broadcast time.

30. The article of manufacture of claim 29, wherein the machine-readable medium further includes instructions to detect information that accompanies the programming content to determine whether to record the portion of the programming content.

31. The article of manufacture of claim 30, wherein the information comprises triggers.

32. The article of manufacture of claim 29, wherein the remote location comprises an originating broadcaster.

33. The article of manufacture of claim 29, wherein the remote location comprises a parent network.

34. The article of manufacture of claim 29, wherein the remote location comprises an interactive television service.

35. The article of manufacture of claim 29, wherein recording at least a portion of the programming content includes converting the programming content into a streaming data format.

36. The article of manufacture of claim 29, wherein recording at least a portion of the programming content comprises responding to a record-request from a service provider.

37. The article of manufacture of claim 29, wherein retrieving at least one piece of programming content includes correlating the user-specified preference with stored information, the stored information corresponding to the piece of programming content to be retrieved.

38. A method, comprising:

receiving programming content from a plurality of broadcasters at a broadcast center via a communications link;

recording at least a portion of the programming content in a storage device;

broadcasting the programming content as an original broadcast to a plurality of client terminals at a broadcast time;

receiving a request for at least one piece of programming content from at least one service provider via the communication link, wherein the at least one piece of programming content comprises programming content included in the original broadcast;

retrieving the at least one piece of programming content from the storage device; and transmitting the at least one piece of programming content to at least one service provider at a time different from the broadcast time.

\* \* \* \* \*